US011657516B2

United States Patent
Mou

(10) Patent No.: US 11,657,516 B2
(45) Date of Patent: May 23, 2023

(54) TARGET TRACKING METHOD AND COMPUTING DEVICE

(71) Applicant: OmniVision Sensor Solution (Shanghai) Co., Ltd, Shanghai (CN)

(72) Inventor: Xiaozheng Mou, Shanghai (CN)

(73) Assignee: OMNIVISION SENSOR SOLUTION (SHANGHAI) CO., LTD, Shanghai (CN)

(*) Notice: Subject to any disclaimer, the term of this patent is extended or adjusted under 35 U.S.C. 154(b) by 192 days.

(21) Appl. No.: 17/324,208

(22) Filed: May 19, 2021

(65) Prior Publication Data
US 2021/0279890 A1 Sep. 9, 2021

Related U.S. Application Data

(63) Continuation of application No. PCT/CN2018/120049, filed on Dec. 10, 2018.

(30) Foreign Application Priority Data

Nov. 27, 2018 (CN) .......................... 201811428965.5

(51) Int. Cl.
*G06K 9/00* (2022.01)
*G06T 7/246* (2017.01)
*G06T 7/215* (2017.01)
*G06V 20/40* (2022.01)
*G06F 18/22* (2023.01)
(Continued)

(52) U.S. Cl.
CPC .............. *G06T 7/246* (2017.01); *G06F 18/22* (2023.01); *G06F 18/23* (2023.01); *G06T 7/215* (2017.01); *G06V 10/62* (2022.01); *G06V 20/17* (2022.01); *G06V 20/40* (2022.01); *G06V 20/44* (2022.01); *G06V 2201/07* (2022.01)

(58) Field of Classification Search
None
See application file for complete search history.

(56) References Cited

U.S. PATENT DOCUMENTS 9,734,587 B2 * 8/2017 Sun .......................... G06F 18/22
10,477,355 B1 * 11/2019 Niranjayan ........... A61B 5/1113
(Continued)

FOREIGN PATENT DOCUMENTS

| CN | 102800106 A | 11/2012 |
| CN | 102881024 A | 1/2013 |

(Continued)

*Primary Examiner* — Soo Jin Park
(74) *Attorney, Agent, or Firm* — IPro, PLLC

(57) ABSTRACT

The present disclosure provides a target tracking method to be executed by a computing device, including: generating an optical flow image in accordance with a series of event data from a dynamic vision sensor, each event being triggered by movement of a target object relative to the dynamic vision sensor; determining a movement speed and a movement direction of at least one target object in a current image frame in accordance with the optical flow image; predicting a position of a corresponding target object in a next image frame in accordance with the movement direction and the movement speed; and when a predicted position is within a range of a field of view, taking the corresponding target object as a to-be-tracked target. The present disclosure further provides a computing device.

9 Claims, 5 Drawing Sheets

(51) Int. Cl.
  *G06F 18/23* (2023.01)
  *G06V 20/17* (2022.01)
  *G06V 10/62* (2022.01)

(56) References Cited

U.S. PATENT DOCUMENTS

2006/0140447 A1* 6/2006 Park .................. G06V 20/58
   382/104
2018/0284777 A1* 10/2018 Li .................... G06V 20/13

FOREIGN PATENT DOCUMENTS

| CN | 104517125 A | 4/2015 |
| CN | 105578034 A | 5/2016 |
| CN | 105761277 A | 7/2016 |

* cited by examiner

TARGET TRACKING METHOD AND COMPUTING DEVICE

CROSS-REFERENCE TO RELATED APPLICATION

The present application claims a priority of the Chinese patent application No. 201811428965.5 filed on Nov. 27, 2018, which is incorporated herein by reference in its entirety.

TECHNICAL FIELD

The present disclosure relates to the field of target tracking technology, in particular to a target tracking method and a computing device.

BACKGROUND

Target tracking has been widely applied in military and civilian areas, e.g., air surveillance, satellite or spacecraft tracking and intelligent video surveillance. As a core technology of a hi-tech weapon system and a Global Positioning System (GPS), accurate target tracking is used to determine a position of a target accurately. Meanwhile, along with the application of a driver assistant system, how to appropriately use a target tracking and processing technology to protect pedestrians and vehicles is currently a hot research project.

In a conventional optical flow-based target tracking method, it is necessary to calculate optical flow information in accordance with two consecutive images at first. During the calculation, there is a large computation burden, and there is a great challenge for real-time performance of an algorithm. In addition, when the conventional tracking method is adopted, the target moving rapidly may be easily lost.

Hence, there is an urgent need to provide an efficient target tracking scheme to reduce the computation burden on the calculation of the optical flow and improve the robustness.

SUMMARY

An object of the present disclosure is to provide a target tracking scheme, so as to solve, or at least relieve, at least one of the above-mentioned problems.

In one aspect, the present disclosure provides in some embodiments a target tracking method to be executed by a computing device, including: generating an optical flow image in accordance with a series of event data from a dynamic vision sensor, each event being triggered by movement of a target object relative to the dynamic vision sensor; determining a movement speed and a movement direction of at least one target object in a current image frame in accordance with the optical flow image; predicting a position of a corresponding target object in a next image frame in accordance with the movement direction and the movement speed; and when a predicted position is within a range of a field of view, taking the corresponding target object as a to-be-tracked target.

In a possible embodiment of the present disclosure, the target tracking method further includes storing the predicted position of the to-be-tracked target to match the position of the to-be-tracked target with at least one target object detected in the next image frame. The storing the predicted position of the to-be-tracked target to match the position of the to-be-tracked target with the at least one target object detected in the next image frame includes: calculating a distance between at least one target object in the next image and the predicted position of the to-be-tracked object in the next image frame; and when the distance meets a predetermined condition, determining that target object in the next image frame is the same as the to-be-tracked target.

In a possible embodiment of the present disclosure, the event data includes a coordinate position and a timestamp of each triggered event. The generating the optical flow image in accordance with a series of event data from the dynamic vision sensor includes: dividing the event data within a predetermined interval into a predetermined quantity of event segments in a chronological order of the timestamps; assigning different pixel values for events within different event segments; and generating the optical flow image in accordance with the coordinate position and the pixel value of each event.

In a possible embodiment of the present disclosure, the determining the movement speed and the movement direction of the at least one target object in the current image frame in accordance with the optical flow image includes: calculating a target region corresponding to each target object in the current image frame; performing clustering treatment on pixels in each target region to acquire a first region and a second region corresponding to each target object; and taking a direction from the first region toward the second region as the movement direction of the corresponding target object.

In a possible embodiment of the present disclosure, the determining the movement speed and the movement direction of the at least one target object in the current image frame in accordance with the optical flow image further includes: calculating a distance between the first region and the second region corresponding to each target object as a movement distance of the target object; determining a movement time of the target object in accordance with pixel values of the pixels in the first region and the second region; and determining the movement speed of the target object in accordance with the movement distance and the movement time.

In a possible embodiment of the present disclosure, the taking the direction from the first region toward the second region as the movement direction of the corresponding target object includes: determining central pixels in the first region and the second region as a first center and a second center respectively; and taking a direction from the first center toward the second center as the movement direction of the target object.

In a possible embodiment of the present disclosure, the calculating the distance between the first region and the second region corresponding to each target object as the movement distance of the target object includes calculating a distance between the first center and the second center as the movement distance of the corresponding target object.

In a possible embodiment of the present disclosure, the determining the movement time of the target object in accordance with the pixel values of the pixels in the first region and the second region includes: determining a time length of a unit pixel in accordance with a pixel value and a duration corresponding to each event segment; calculating a difference between an average pixel value of the pixels in the first region and an average pixel value of the pixels in the second region corresponding to the target object; and determining the movement time of the target object in accordance with the difference and the time length of the unit pixel.

In a possible embodiment of the present disclosure, the target tracking method further includes, when the predicted position is not within the range of the field of view, not tracking the corresponding target object any longer.

In a possible embodiment of the present disclosure, the target tracking method further includes, when the distance between each target position in the next image frame and the predicted position of the to-be-tracked target does not meet the predetermined condition, taking the target object as a new to-be-tracked target.

In another aspect, the present disclosure provides in some embodiments a computing device, including one or more processors, a memory, and one or more programs stored in the memory and executed by the one or more processors. The one or more programs includes instructions for implementing the above-mentioned target tracking method.

In yet another aspect, the present disclosure provides in some embodiments a computer-readable storage medium storing therein one or more programs including instructions. The instructions are executed by a computing device so as to implement the above-mentioned target tracking method.

According to the embodiments of the present disclosure, the optical flow image may be generated in accordance with each piece of varying event data from a dynamic vision sensor (DVS), and the movement direction and the movement speed of the target object may be predicted in accordance with optical flow information carried in the optical flow image, so as to determine the to-be-tracked target. In addition, through matching the to-be-tracked target in the current image frame with at least one target object detected in the next image frame, it is able to ensure the accuracy of the target tracking, and remarkably reduce the computation burden.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

DETAILED DESCRIPTION

Figure 1:
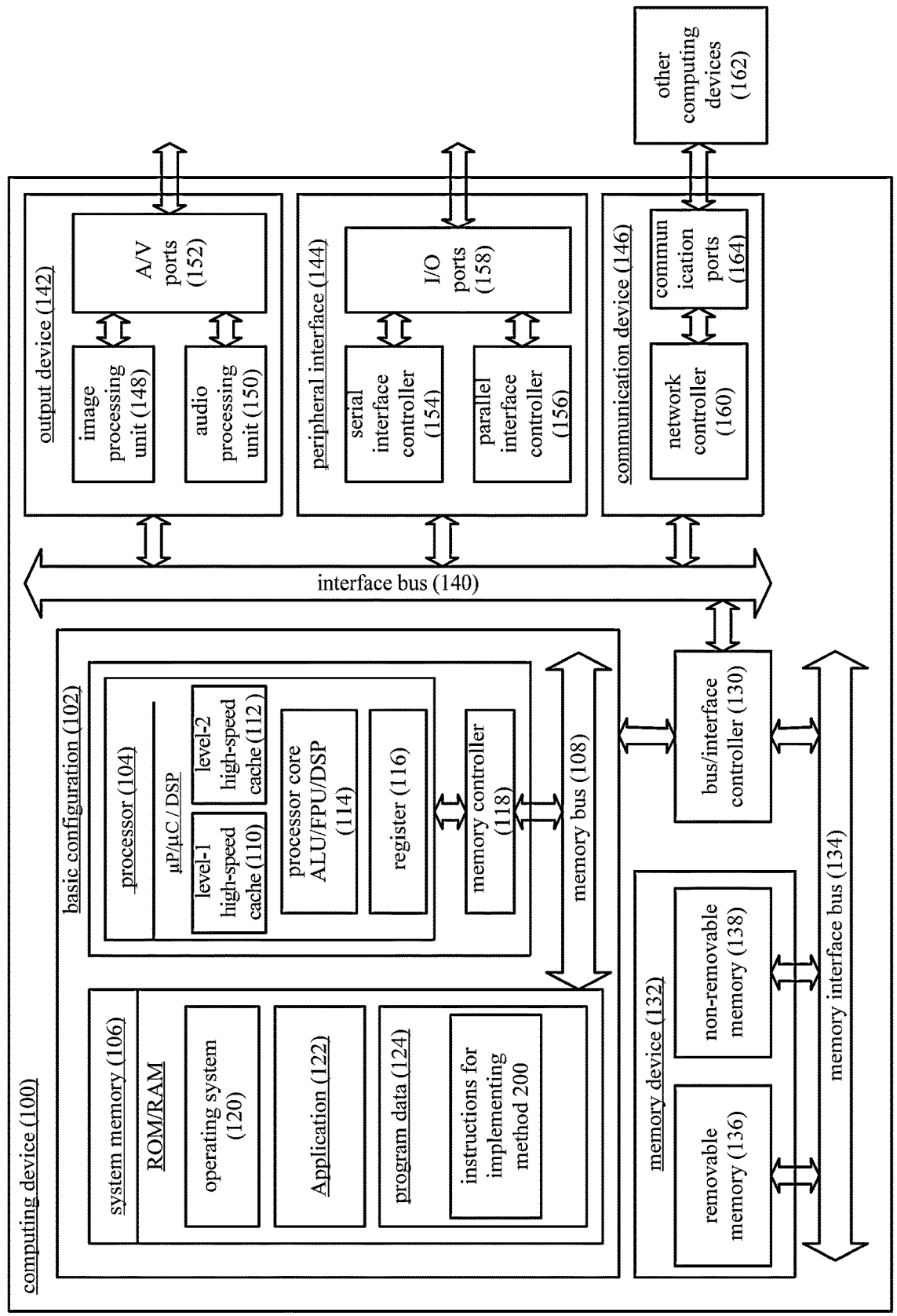
FIG. 1 is a schematic view showing a computing device 100 according to one embodiment of the present disclosure.

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

Recently, a DVS has attracted more and more attentions in the field of computer vision technology. The DVS is a biologically-mimic vision sensor for simulating a pulse-triggered neuron-based human retina, and it is provided with an array consisting of a plurality of pixel units. Each pixel unit may response to, and record an area where a light intensity changes rapidly merely when a light intensity change has been sensed. A specific constitution of the DVS will not be particularly defined herein. An event-triggered processing mechanism is adopted by the DVS, so it may output an asynchronous event data flow. The event data flow may be, for example, light intensity change information (e.g., a timestamp of the light intensity change and a light intensity threshold) and a coordinate position of a triggered pixel unit. Based on the above-mentioned operating principle, it is found that, as compared with a conventional vision sensor, the DVS has the following advantages. 1) The DVS is capable of detecting a high-speed object moving at a speed of up to ten thousand frames per second, without any restraint from an exposure time and a frame rate. 2) The DVS has a larger dynamic range, and it is capable of accurately sensing and output a scenario change even in a low-light or highly-exposed environment. 3) The DVS has lower power consumption. 4) Each pixel unit in the DVS responds to the light intensity change independently, so the DVS is not affected by motion blur.

Based on the above, the present disclosure provides in some embodiments a DVS-based target tracking scheme, so as to reduce the computation burden and improve the robustness as compared with the related art. In addition, the target tracking scheme in the embodiments of the present disclosure focuses on positioning and matching a plurality of targets of interest in a multi-target tracking scenario, so as to maintain identities (IDs) of the plurality of targets in the scenario and record a movement trajectory of each of the plurality of targets.

In some embodiments of the present disclosure, an event data flow from the DVS in a scenario may be transmitted to one or more computing devices, so as to enable the computing device to perform a series of treatment on the event data flow, e.g., generating a corresponding optical flow image in accordance with the event data flow, predicting a possible position of a target detected in a current image frame in a next image frame, and matching the predicted target position with an actual target position, thereby to finally implement the target tracking scheme in the embodiments of the present disclosure.

In some embodiments of the present disclosure, the one or more computing devices for implementing the target tracking scheme may be a computing device 100 as shown in FIG. 1.

In a basic configuration 102, the computing device 100 typically includes a system memory 106 and one or more processors 104. A memory bus 108 may be used for the communication between the processor 104 and the system memory 106.

Depending on a desired configuration, the processor 104 may be of any type, and it may include, but not limited to, microprocessor (μP), microcontroller (μC), Digital Signal Processor (DSP), or a combination thereof. The processor 140 may include one or more levels of high-speed caches (e.g., a level-1 high-speed cache 110 and a level-2 high-speed cache 112), a processor core 114 and a register 116. The processor core 114 may include an Arithmetic Logical Unit (ALU), a Float Point Unit (FPU), a DSP core, or a combination thereof. A memory controller 118 may be used together with the processor 104, or in some embodiments of the present disclosure, the memory controller 118 may be an internal component of the processor 104.

Depending on a desired configuration, the system memory 106 may be of any type, and it may include, but not limited to, volatile memory (e.g., Random Access Memory (RAM)), non-volatile memory (e.g., Read Only Memory (ROM) or flash memory), or a combination thereof. The system memory 106 may include an operating system 120, one or more applications 122, and program data 124. In some embodiments of the present disclosure, the application 122 may be operated using the program data 124 on the operating system. In some embodiments of the present disclosure, the computing device 100 is configured to execute the target tracking method, and the program data 124 may include instructions for implementing the target tracking method.

The computing device 100 may further include an interface bus 140 for the communication between various interface devices (e.g., an output device 142, a peripheral interface 144 and a communication device 146) and the basic configuration 102 via a bus/interface controller 130. The output device 142 may include a graphical processing unit 148 and an audio processing unit 150, which are configured to facilitate the communication with various external devices, e.g., display and loudspeaker, via one or more A/V ports 152. The peripheral interface 144 may include a serial interface controller 154 and a parallel interface controller 156, which are configured to facilitate the communication with the external devices, such as input devices (e.g., keyboard, mouse, pen, voice input device and image input device) or the other devices (e.g., printer or scanner) via one or more I/O ports 158. The communication device 146 may include a network controller 160, which is configured to communicate with one or more other computing devices 162 using a network communication link via one or more communication ports 164.

The network communication link may be an instance of a communication medium. Usually, the communication medium may be embodied as a computer-readable instruction, data structure or program module in a modulated data signal such as carrier or the other transmission mechanism, and it may include any information delivery medium. For the so-called modulated data signal, one or more data sets of the modulated data signal or the modulated data signal itself may be changed through encoding information in a signal. As a non-restrictive example, the communication medium may include a wired medium (e.g., wired network or private wire network), or a wireless medium (e.g., sound, Radio Frequency (RF), microwave, infrared (IR) or the like). The term "computer-readable medium" may include both the memory medium and the communication medium.

The computing device 100 may be a personal computer, e.g., desk-top computer or laptop computer. Of course, the computing device 100 may also be a part of a small-size portable (or mobile) electronic device, e.g., cellular phone, digital camera, PDA, Personal Media Player, wireless network browser, heat-mounted device, application-specific device, or a device including the above functions, which will not be particularly defined herein.

Figure 2:
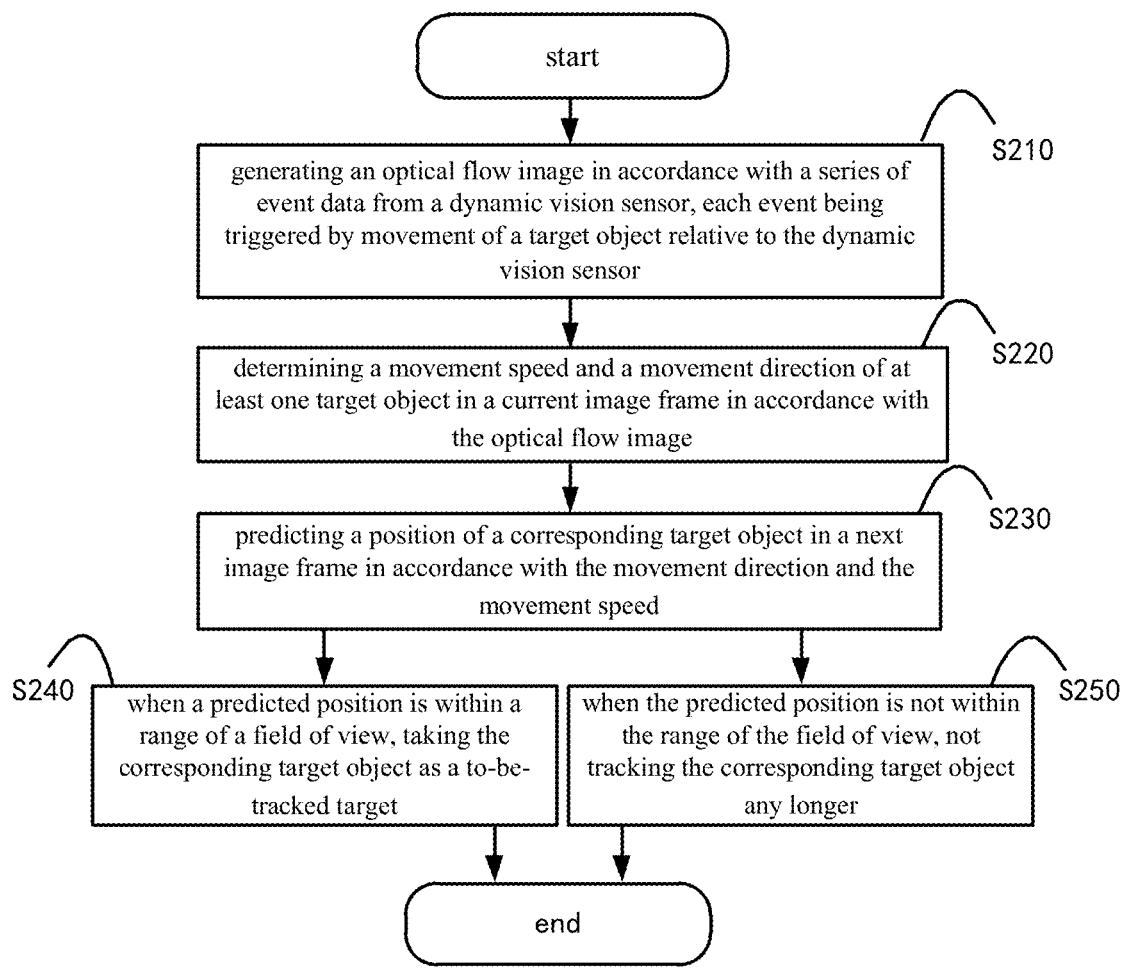
FIG. 2 is a flow chart of a target tracking method 200 according to one embodiment of the present disclosure.

The present disclosure provides in some embodiments a target tracking method 200 which, as shown in FIG. 2, includes the following steps.

Step S210: generating an optical flow image in accordance with a series of event data from a dynamic vision sensor. As mentioned hereinabove, each event may be triggered by movement of a target object in a scenario relative to the dynamic vision sensor, and the event data outputted by the dynamic vision sensor may include a coordinate position of the triggered event and a timestamp for a triggering time of the event.

In the embodiments of the present disclosure, the optical flow image may be generated in accordance with a series of event data from the DVS at a predetermined interval. A length of the interval may be set according to experiences and an actual scenario, e.g., it may be set as 20 ms, 40 ms or 60 ms, which will not be particularly defined herein. In a possible embodiment of the present disclosure, the optical flow image may be generated as follows.

At first, the event data within the predetermined interval may be divided into a predetermined quantity of event segments in a chronological order of the timestamps. In a possible embodiment of the present disclosure, the predetermined quantity may be 255. For example, the event data within the predetermined interval may be divided into 255 event segments in a chronological order of the timestamps. It should be appreciated that, a length of each event segment will not be particularly defined herein, and in some embodiments of the present disclosure, the event segments may have a substantially consistent length.

Next, different pixel values may be assigned for the events in different event segments. In a possible embodiment of the present disclosure, a same grayscale value may be assigned for all events in one event segment. In addition, the larger the grayscale value, the closer the timestamp where the event is triggered, and vice versa. For example, the grayscale values 1 to 255 may be assigned for the events in 255 event segments in a chronological order of the timestamps.

Finally, the optical flow image may be generated in accordance with the coordinate position and the pixel value of each event. In a possible embodiment of the present disclosure, a size of the optical flow image may be set to be identical to a size of a pixel unit array in the DVS, so that each pixel point in the optical flow image corresponds to one pixel unit in the DVS. The pixel value assigned for the triggered event may be written into a corresponding pixel point in the optical flow image, and a pixel value for each pixel point corresponding to the event that is not triggered may be set as 0.

It should be appreciated that, the predetermined quantity mentioned hereinabove may also be any integer greater than 1 (but not limited to 255), as long as the predetermined quantity is associated with the pixel value assigned for each event. Here, the predetermined quantity is set as 255, so as to be consistent with the pixel values of a conventional grayscale image (in an 8-bit quantization scenario, the pixel values are 0 to 255), thereby to provide the generated optical flow image with a better visual effect. In addition, in a 10-bit quantization scenario, the predetermined quantity may be set as 1023, and the grayscale values 1 to 1023 may be assigned for the events in 1023 event segments in a chronological order of the timestamps, which will not be particularly defined herein.

Figure 3:
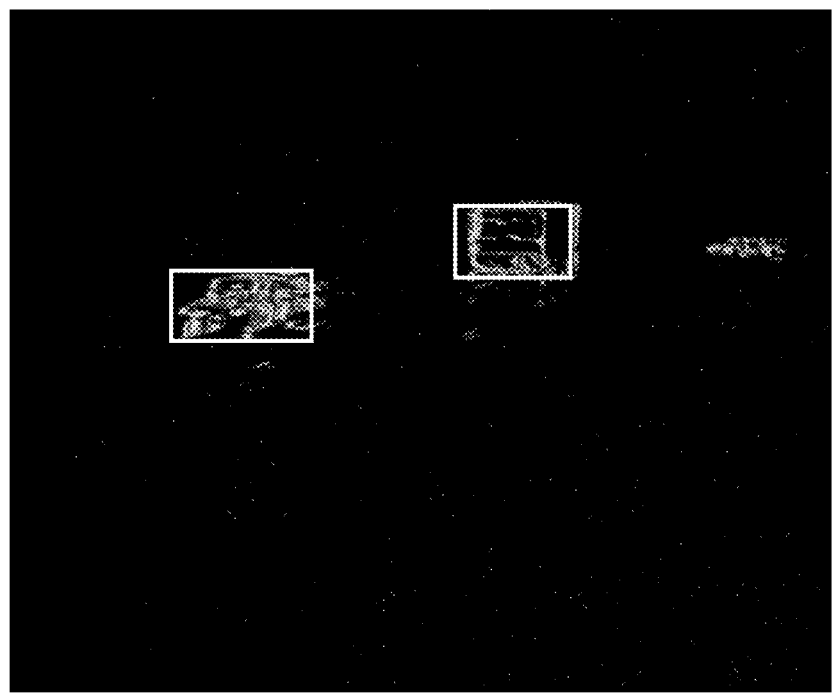
FIG. 3 is a schematic view showing a generated optical flow image according to one embodiment of the present disclosure.

FIG. 3 is a schematic view showing the generated optical flow image according to one embodiment of the present disclosure. In FIG. 3, the optical flow image is a grayscale image. In actual use, in order to improve the visual effect, the pixel points in different event segments may be represented by different colors. For example, red may be used to represent the pixel values in an event segment whose timestamp is larger, and blue may be used to represent the pixel values in an event segment whose timestamp is smaller. Of course, the present disclosure shall not be limited thereto.

The target object in the optical flow image may be detected through a target detection algorithm in accordance with the generated optical flow image. Generally, each detected target object may be surrounded by a rectangular box, and a coordinate position of the rectangular box may be returned as the position of the target object. The target detection algorithm will not be particularly defined herein, and any know or future target detection algorithm may be adopted to implement the target tracking method 200 in the embodiments of the present disclosure. It should be appreciated that, what is discussed in the embodiments of the present disclosure relates to the detection of at least one target object in the optical flow image. As shown in FIG. 3, an image acquired through processing the optical flow image using the target detection algorithm includes two target objects which are surrounded by two rectangular boxes respectively.

Step S220: determining a movement speed and a movement direction of each target object detected in a current image frame in accordance with the optical flow image.

A procedure of determining the movement speed of the target object will be described hereinafter.

1) At first, a target region corresponding to each target object in the current image frame may be calculated.

In a possible embodiment of the present disclosure, at least one target object in the optical flow image may be detected through the target detection algorithm, the rectangular box representing the position of the target object may be acquired, and then a rectangular region surrounded by the rectangular box may be taken as the target region corresponding to the target object. In other words, each target object may correspond to one target region.

2) Next, clustering treatment may be performed on pixels in each target region to acquire a first region and a second region corresponding to each target object.

In a possible embodiment of the present disclosure, with respect to each target region, the clustering treatment may be performed on the pixels in the target region in accordance with the pixel values, so as to acquire two types of pixels. In one type of pixels, the pixel values are relatively small, and a region corresponding to these pixels may be taken as the first region corresponding to the target object. In another type of pixels, the pixel values are relatively large, and a region corresponding to these pixels may be taken as the second region corresponding to the target object. In the embodiments of the present disclosure, a clustering algorithm for the clustering treatment will not be particularly defined.

In another possible embodiment of the present disclosure, a threshold may be set according to experiences, and the pixels in the target region may be divided into two types in accordance with the threshold, so as to acquire the first region and the second region corresponding to the target object. For example, when the optical flow image is a grayscale image with pixel values from 0 to 255, the threshold may be set as 127. When pixel values of pixels in the target region are within the range of 1 to 127, a region corresponding to these pixels may be the first region, and when pixel values of pixels in the target region are within the range of 128 to 255, a region corresponding to these pixels may be the second region. It should be appreciated that, a value of the threshold will not be particularly defined herein.

In a word, a method for acquiring the first region and the second region corresponding to each target object will not be particularly defined herein. Based on the above, in the embodiments of the present disclosure, the event corresponding to the pixels in the first region is triggered before the event corresponding to the pixels in the second region.

3) Finally, a direction from the first region to the second region may be taken as the movement direction of the target object.

In a possible embodiment of the present disclosure, a central pixel in the first region and a central pixel in the second region corresponding to the target object may be determined as a first center and a second center respectively. For example, average coordinates of all pixels in the first region may be calculated as coordinates of the first center, and average coordinates of all pixels in the second region may be calculated as coordinates of the second center. Then, a direction from the first center to the second center may be taken as the movement direction of the target object.

A procedure of determining the movement speed of the target object will be described hereinafter.

In a possible embodiment of the present disclosure, the movement speed of the target object may be calculated in accordance with a movement distance and a movement time. Hence, the movement distance and the movement time of the target object may be determined at first.

a) At first, with respect to each target object, a distance between the first region and the second region corresponding to the target object may be calculated as the movement distance of the target object. With reference to the above description about how to determine the movement direction of the target object, the central pixel in the first region and the central pixel in the second region may be determined as the first center and the second center respectively, and then a distance between the first center and the second center may be taken as the movement distance of the target object.

b) Next, the movement time of the target object may be determined in accordance with the pixel values of the pixels in the first region and the second region.

In a possible embodiment of the present disclosure, the movement time may be calculated in accordance with the length of the predetermined interval acquired in Step S210 as follows.

At first, a time length of a unit pixel may be determined in accordance with the pixel value and a duration corresponding to each event segment. For example, when the event data within the predetermined interval T has been acquired in Step S210 and has been divided into 255 event segments, the duration corresponding to each event segment may be T/255. As mentioned hereinabove, 255 pixel values may be assigned for the 255 event segments sequentially, i.e., the pixel value corresponding to the event segment may be 1. In this way, the time length t corresponding to the unit pixel may be just T/255.

Next, a difference between an average pixel value of the pixels in the first region and an average pixel value of the pixels in the second region corresponding to the target object may be calculated. To be specific, with respect to each target object, an average pixel value A1 of all pixels in the first region may be calculated, then an average pixel value A2 of all pixels in the second region may be calculated, and then A1 may be subtracted from A2 to acquire the difference a corresponding to the target object.

Finally, with respect to each target object, the movement time of the target object may be determined in accordance with the difference a and the time length of the unit pixel. In a possible embodiment of the present disclosure, the time length t of the unit pixel may be multiplied by the difference a to acquire the movement time of the target object.

c) The movement speed of the target object may be determined in accordance with the movement distance of the target object acquired in a) and the movement time of the target object acquired in b). In a possible embodiment of the present disclosure, the movement distance may be divided by the movement time to acquire the movement speed, which will not be particularly defined herein.

Figure 4:
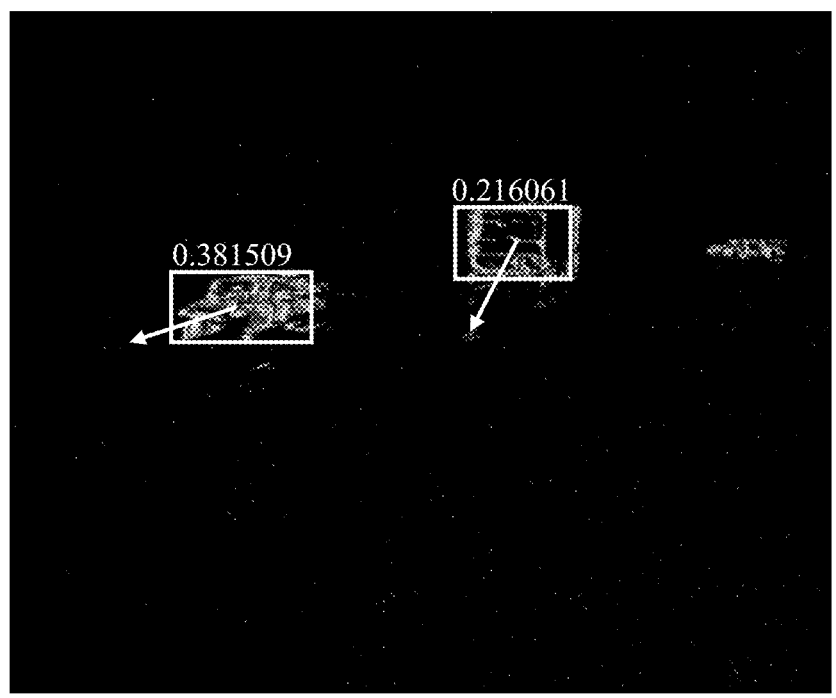
FIG. 4 is a schematic view showing a movement speed and a movement direction of a target object in the optical flow image according to one embodiment of the present disclosure.

FIG. 4 is a schematic view showing the movement speed and the movement direction of the target object in the optical flow image according to one embodiment of the present disclosure. As shown in FIG. 4, after Step S220 on the optical flow image in FIG. 3, the movement speed and the movement direction of each of the two target objects in the image frame may be determined. In FIG. 4, each target object is indicated by the rectangular box, a number above each rectangular box represents the movement speed of the target object, and an arrow indicates the movement direction of the target object. It should be appreciated that, FIG. 4 is merely provided so as to show the movement direction and the movement speed of the predicted target object in a vivid manner, but the present disclosure shall not be limited thereto.

Step S230: predicting a position of a corresponding target object in a next image frame in accordance with the movement direction and the movement speed.

In a possible embodiment of the present disclosure, the rectangular box representing the position of the target object may be moved along the movement direction by a certain distance, and a resultant position of the rectangular box may be just the predicted position of the target object in the next image frame. The so-called "certain distance" may be determined in accordance with the movement speed of the target object. For example, when the movement speed of the target object is v and the event data is acquired in Step S210 at the predetermined interval T to generate the optical flow image, the movement distance of the rectangular box presenting the position of the target object along the movement direction may be just v*T.

Figure 5A:
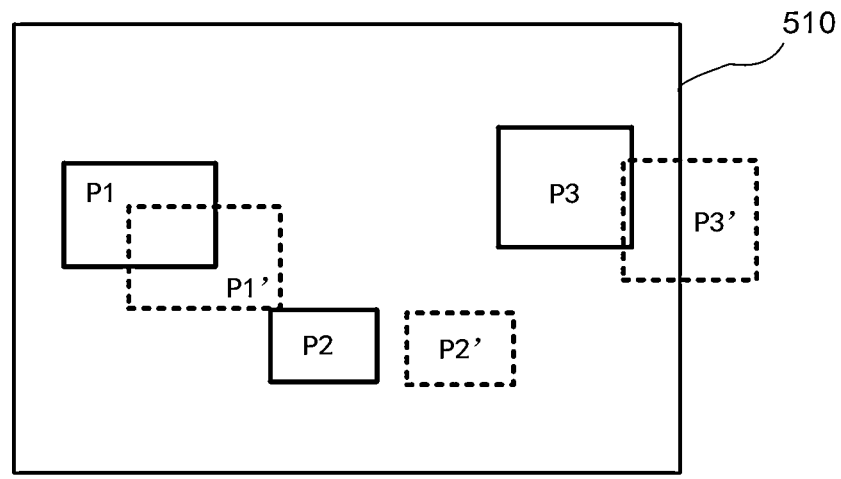
FIGS. 5A and 5B are schematic views showing the determination of the target object in two consecutive image frames according to one embodiment of the present disclosure.
Figure 5B:
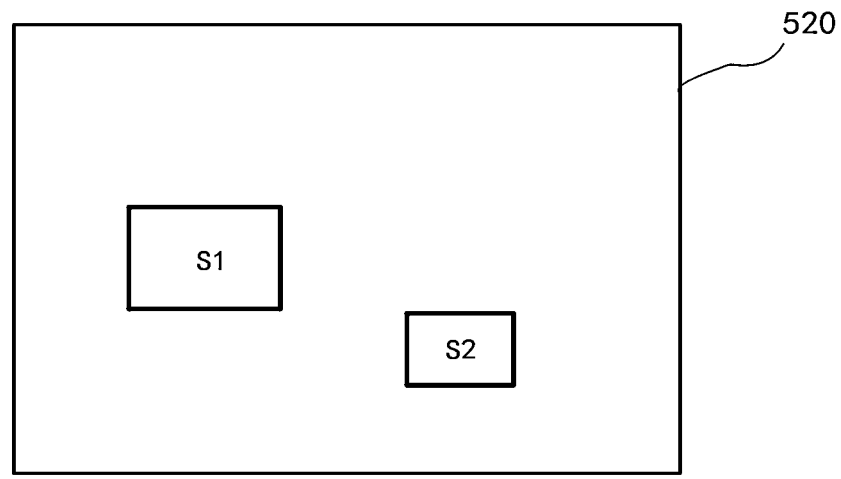

Then, with respect to each target object in the current image frame, whether a corresponding target object is to be tracked may be determined in accordance with the predetermined position. For ease of description, FIGS. 5A to 5B are schematic views showing the determination of the target object in consecutive image frames according to one embodiment of the present disclosure. FIG. 5A shows a current image frame 510 and detected target objects (P1, P2 and P3), and FIG. 5B shows a next image frame and detected target objects (S1 and S2).

Step S240: when the predicted position is within a range of a field of view, taking the corresponding target object as a to-be-tracked target.

As shown in FIG. 5A, each solid rectangular box represents the target object (P1, P2 or P3) in the current image frame 510, and each dotted rectangular box represents a predicted position (P1', P2' or P3') of the target position (P1, P2 or P3) in the next image frame 520. As shown in FIG. 5A, the predicted positions P1' and P2' are still in the optical flow image, so the two target objects (P1 and P2) may be taken as the to-be-tracked targets. P3' is not in the optical flow image, so the target object P3 may not be taken as the to-be-tracked target any more.

In some embodiments of the present disclosure, after the to-be-tracked target has been determined, the predicted position of the to-be-tracked target may be stored, so as to be matched with the target object detected in the next image frame. Taking FIG. 5A as an example, the predicted positions P1' and P2' of the to-be-tracked targets P1 and P2 may be stored. Of course, a matching pool may be created in accordance with the stored predicted positions.

In a possible embodiment of the present disclosure, an optical flow image (a next image frame) is generated in accordance with event data within a next predetermined interval and a target object has been detected in the next image frame, the detected target object may be matched with the target objects in the matching pool. When there is a target object in the matching pool matching the target object detected in the next image frame, the target object detected in the next image frame may be determined as identical to the target object in matching pool. When there is no target object in the matching pool matching the target object detected in the next image frame, the target object detected in the next image frame may be determined as a new target object. For the new target object, the above Steps S220 and S230 may be performed, so as to predict a position of the new target object in a next image frame and then determine whether the new target object is a to-be-tracked target, which will not be particularly defined herein.

A procedure of matching the at least one target object detected in the next image frame will be described hereinafter.

At first, a distance between the at least one target object in the next image frame and the predicted position of the to-be-tracked object may be calculated. In other words, with respect to each target object in the next image frame, the distance between it and the predicted position of the to-be-tracked target may be calculated. Generally, a Euclidean distance between two rectangular boxes corresponding to target objects (e.g., a Euclidean distance between centers of the two rectangular boxes) may be calculated as the distance between the two objects. The calculation of the Euclidean distance is known in the art and thus will not be particularly defined herein. It should be appreciated that, apart from the Euclidean distance, any other distance calculation mode may also be adopted in the method 200 so as to implement the target tracking scheme. When the distance meets a predetermined condition, the target object in the next image frame may be determined as identical to the to-be-tracked object. The predetermined condition may be, for example, that the distance is minimum, i.e., when the distance between the target object in the next image frame and the predicted position of the target object in the matching pool is minimum, the to-be-tracked target corresponding to the predicted position may be determined as identical to the target object in the next image frame.

Still taking the optical flow image in FIG. 5A as an example, FIG. 5B shows the next image frame 520 corresponding to the optical flow image in FIG. 5A. Two target objects S1 and S2 are detected in FIG. 5B through the target detection algorithm. At this time, the matching pool includes two predicted positions P1' and P2', and a distance d1 between S1 and P1', a distance d2 between S1 and P2', a distance d3 between S2 and P1' and a distance d4 between S2 and P2' may be calculated. These distances may be compared with each other. When d1<d2, S1 in FIG. 5B may be determined as identical to P1 in FIG. 5A, and when d3>d4, S2 in FIG. 5B may be determined as identical to P2 in FIG. 5A.

Then, an ID of each target object may be determined and a movement trajectory of each target object may be recorded, so as to acquire a corresponding tracking result, which will not be particularly defined herein. The present disclosure aims to focus on how to rapidly determine the to-be-tracked target in the field of view in accordance with the optical flow information and determine the positions of the to-be-tracked target in two consecutive image frames.

In another possible embodiment of the present disclosure, apart from the minimum distance, the predetermined condition may further include that the distance is greater than a predetermined distance. For example, the predetermined distance may be set in advance, and when the distance between the target object in the next image frame and the predicted position of the to-be-tracked target is greater than the predetermined distance, the distance may be determined as not meeting the predetermined condition, and no matching may be performed, i.e., the target object in the next image frame may be directly taken as a new to-be-tracked target.

Figure 6A:
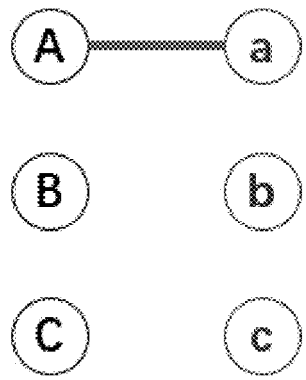
FIGS. 6A to 6C are schematic views showing the matching of target objects according to one embodiment of the present disclosure.
Figure 6B:
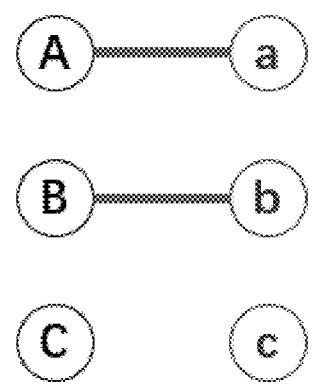
Figure 6C:
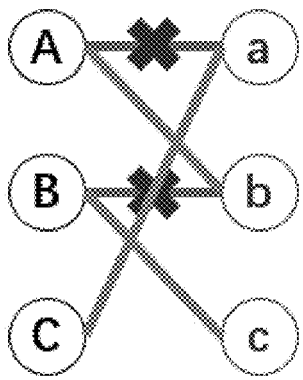

In yet another possible embodiment of the present disclosure, in order to match more target objects as possible, the matching may be performed through a Hungarian algorithm in accordance with the distance between two target objects. FIGS. 6A to 6C are schematic views showing the matching of the target object through the Hungarian algorithm. A matching procedure will be described hereinafter in conjunction with FIGS. 6A to 6C.

(1) It is presumed that three target objects (A, B and C) have been detected in the next image frame and there are three predicted positions (a, b and c) of to-be-tracked targets in the matching pool. At first, a distance between A and each of a, b and c in the matching pool may be calculated. As mentioned hereinabove, a target object corresponding to the predicted position with a minimum distance from the target object A may be taken as the matched target object. It is presumed that the target object A matches the target object corresponding to a, as shown in FIG. 6A.

(2) The target object B in the matching pool may be matched to the predicted position with a minimum distance using a same method as that in (1). It is presumed that the target object B matches the target object corresponding to b, as shown in FIG. 6B.

(3) The target object C in the matching pool may be continuously matched to the predicted position with a minimum distance. At this time, it is presumed that a distance between C and a is minimum, but a has been matched to the target object A in (1). In order to enable C to be matched to an appropriate predicted position, a matching relation between A and a may be removed, e.g., "x" in FIG. 6C. Then, C may be matched to a, and A may be tried to be matched to a predicted position with a second minimum distance, e.g., b. However, b has been matched to the target object B in (2). Identically, a matching relation between B and b may be removed. In this way, A may be matched to b and B may be matched to c finally.

The Hungarian algorithm is already known in the art, and the matching through the Hungarian algorithm will not be particularly defined herein. It should be appreciated that, the above is merely an exemplary mode of matching the target objects, and the present disclosure shall not be limited thereto. In an actual scenario, a corresponding matching mode may be set by a person skilled in the art based on the above description.

Step S250: when the predicted position is not within the range of the field of view, not tracking the corresponding target object any longer. As shown in FIG. 5A, the predicted position P3' of the target object P3 has already gone beyond the range of the optical flow image, so the target object P3 may not be tracked any longer.

The present disclosure provides a DVS-based target tracking scheme, so as to solve such problems in the related art as a large computation burden and insufficient robustness. Considering that each piece of varying event data from the DVS carries time information, so the optical flow image may be generated in accordance with the event data to directly acquire the optical flow information. In addition, the movement direction and the movement speed of the target object may be estimated in accordance with the optical flow information, so as to track the target object in an accurate manner. When the conventional tracking method is adopted, the target object moving rapidly in the field of view may be easily lost. However, through the target tracking method in the embodiments of the present disclosure, it is able to remarkably reduce the computation burden for the optical flow, and thereby improve the robustness.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be further appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

In addition, it should be appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements. In addition, the device is used to achieve functions of the elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

The invention claimed is:

1. A target tracking method to be executed by a computing device, comprising:
generating an optical flow image in accordance with a series of event data from a dynamic vision sensor, each event being triggered by movement of a target object relative to the dynamic vision sensor, and the event data comprises a coordinate position and a timestamp of each triggered event, wherein the generating the optical flow image in accordance with a series of event data from the dynamic vision sensor comprises: dividing the event data within a predetermined interval into a predetermined quantity of event segments in a chronological order of the timestamps; assigning different pixel values for events within different event segments; and generating the optical flow image in accordance with the coordinate position and the pixel value of each event;
determining a movement speed and a movement direction of at least one target object in a current image frame in accordance with the optical flow image;
predicting a position of a corresponding target object in a next image frame in accordance with the movement direction and the movement speed; and
when a predicted position is within a range of a field of view, taking the corresponding target object as a to-be-tracked target, and storing the predicted position of the to-be-tracked target to match the position of the to-be-tracked target with at least one target object detected in the next image frame, comprises: calculating a distance between at least one target object in the next image and the predicted position of the to-be-tracked object in the next image frame; and when the distance meets a predetermined condition, determining that target object in the next image frame is the same as the to-be-tracked target;
when the predicted position is not within the range of the field of view, not tracking the corresponding target object any longer.

2. The target tracking method according to claim 1, wherein the determining the movement speed and the movement direction of the at least one target object in the current image frame in accordance with the optical flow image comprises:
calculating a target region corresponding to each target object in the current image frame;
performing clustering treatment on pixels in each target region to acquire a first region and a second region corresponding to each target object; and
taking a direction from the first region toward the second region as the movement direction of the corresponding target object.

3. The target tracking method according to claim 2, wherein the determining the movement speed and the movement direction of the at least one target object in the current image frame in accordance with the optical flow image further comprises:
calculating a distance between the first region and the second region corresponding to each target object as a movement distance of the target object;
determining a movement time of the target object in accordance with pixel values of the pixels in the first region and the second region; and
determining the movement speed of the target object in accordance with the movement distance and the movement time.

4. The target tracking method according to claim 3, wherein the taking the direction from the first region toward the second region as the movement direction of the corresponding target object comprises:
determining central pixels in the first region and the second region as a first center and a second center respectively; and
taking a direction from the first center toward the second center as the movement direction of the target object.

5. The target tracking method according to claim 4, wherein the calculating the distance between the first region and the second region corresponding to each target object as the movement distance of the target object comprises calculating a distance between the first center and the second center as the movement distance of the corresponding target object.

6. The target tracking method according to claim 5, wherein the determining the movement time of the target object in accordance with the pixel values of the pixels in the first region and the second region comprises:
determining a time length of a unit pixel in accordance with a pixel value and a duration corresponding to each event segment;
calculating a difference between an average pixel value of the pixels in the first region and an average pixel value of the pixels in the second region corresponding to the target object; and
determining the movement time of the target object in accordance with the difference and the time length of the unit pixel.

7. The target tracking method according to claim 6, further comprising, when the distance between each target position in the next image frame and the predicted position of the to-be-tracked target does not meet the predetermined condition, taking the target object as a new to-be-tracked target.

8. A computing device, comprising one or more processor, a memory, and one or more programs stored in the memory and executed by the one or more processors, wherein the one or more programs comprises instructions for implementing the target tracking method according to claim 7.

9. A non-transitory computer-readable storage medium storing therein one or more programs, wherein the one or more programs comprises instructions, and the instructions are executed by a computing device so as to implement the target tracking method according to claim 7.

* * * * *